(12) United States Patent
Kitamura

(10) Patent No.: US 6,870,649 B2
(45) Date of Patent: Mar. 22, 2005

(54) HOLOGRAPHIC VIEWING DEVICE, AND COMPUTER-GENERATED HOLOGRAM FOR THE SAME

(75) Inventor: Mitsuru Kitamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/632,830

(22) Filed: Aug. 4, 2003

(65) Prior Publication Data

US 2004/0027628 A1 Feb. 12, 2004

(30) Foreign Application Priority Data

Aug. 2, 2002 (JP) ........................................ 2002-225606

(51) Int. Cl.[7] ................................................. G03H 1/00
(52) U.S. Cl. ...................... 359/3; 359/1; 359/9; 359/29
(58) Field of Search ............................. 359/3, 9, 13, 1, 359/2, 22, 29, 32; 351/51, 52, 158

(56) References Cited

U.S. PATENT DOCUMENTS 5,546,198 A * 8/1996 van der Gracht et al. ...... 359/1
6,452,699 B1 * 9/2002 Athale et al. .................. 359/13
2004/0030732 A1 * 2/2004 Gerspach et al. ........... 708/111

* cited by examiner

*Primary Examiner*—Fayez G. Assaf
(74) *Attorney, Agent, or Firm*—Sughrue Mion, PLLC

(57) ABSTRACT

The invention relates to a holographic viewing device that enables a bright reconstructed pattern to be viewed in place of light sources in a scene while a spot due to zero-order transmitted light is kept unnoticeable, and a computer-generated hologram for the same. The invention provides a holographic viewing device comprising a frame and a computer-generated hologram fitted in the frame. The computer-generated hologram is constructed as a transmission Fourier transform hologram. The computer-generated hologram comprises minuscule cells having pitches $\delta_x$ and $\delta_y$ with a reconstruction image area defined by a range of spreading of ± first-order diffracted light of given wavelength from a diffraction grating having grating pitches $2\delta_x$ and $2\delta_y$ that are twice as large as said pitches of cells, and an input image pattern 35 reconstructed at that wavelength is recorded in the computer-generated hologram in such a way that a light portion 36 of the input image pattern overlaps the center of the reconstruction image area.

8 Claims, 6 Drawing Sheets

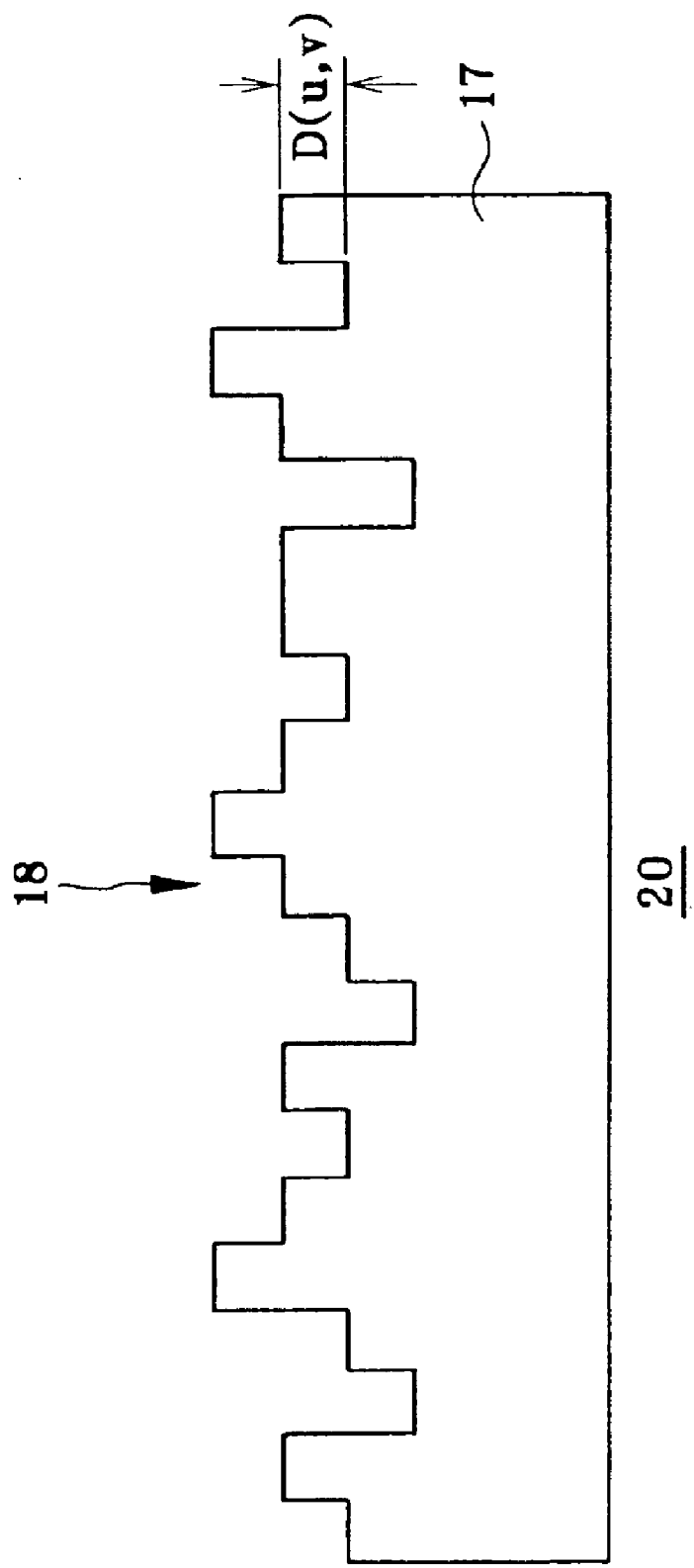

HOLOGRAPHIC VIEWING DEVICE, AND COMPUTER-GENERATED HOLOGRAM FOR THE SAME

BACKGROUND OF THE INVENTION

The present invention relates generally to a holographic viewing device and a computer-generated hologram for the same, and more particularly to holographic spectacles designed such that zero-order light that reaches directly the eye of a viewer without being diffracted through a hologram can be seen in place of light sources in a scene, offering no adverse influence on a pattern, and a computer-generated hologram for the same.

U.S. Pat. No. 5,546,198 has proposed holographic spectacles constructed as shown in the perspective view of FIG. 6(a). As shown, two transmission holograms 2 and 3 are fitted in the two-eye sections of a spectacle frame 1. When the spectacles are used to view a scene including such limited extent light sources 4, 5, 6 and 7 as shown in FIG. 6(b), the user would see it as if shown in FIG. 6(c) as an example. In other words, the user would see the pre-selected patterns "NOEL" 8, 9, 10 and 11 in place of the light sources 4, 5, 6 and 7 in the natural scene of FIG. 6(b). For the transmission holograms 2 and 3 having such characteristics, Fourier transform holograms (Fraunhofer holograms) of the aforesaid pattern "NOEL" designed as computer-generated holograms are used.

In a computer-aided Fourier transform hologram, a limited rectangular area including a pattern (for instance, "NOEL" as mentioned above) recorded in that hologram is divided into a matrix array of cells, so that information regarding a pattern portion corresponding to each cell site can be allocated to each cell, so that a pattern comprising a limited number of cells is projected onto a hologram area far away from it upon Fourier transform. As is the case with the pattern recording area, the hologram area, too, is divided into a matrix array of cells to record amplitude information and phase information at each cell site where the pattern to be recorded is subjected to Fourier transform.

Thus, the Fourier transform computer-generated hologram with pre-selected patterns recorded in it is fabricated in such a way that the diffraction efficiency reaches 100% at a given (design) wavelength. Even so, there is zero-order transmitted light that reaches directly the eye of the viewer without being diffracted through the hologram, because any phase condition is never satisfied at other wavelengths. In a practically fabricated computer-generated hologram, too, there is such zero-order light because its phase distribution, etc. deviate more or less from design values and so the diffraction efficiency does not necessarily reach 100%. This zero-order light is seen as a spot at the center of the reconstructed pattern viewed in place of light sources in a scene, posing an obstacle to viewing.

SUMMARY OF THE INVENTION

In view of such problems with the prior art, the object of the present invention is to provide a holographic spectacles that enable a bright reconstructed pattern to be seen in place of light sources in a scene while a spot due to zero-order transmitted light is unnoticeable, and a computer-generated hologram for the same.

According to the present invention, the above object is achieved by the provision of a holographic viewing device comprising a frame and a computer-generated hologram fitted in said frame, said computer-generated hologram constructed as a transmission Fourier transform hologram, wherein said computer-generated hologram comprises minuscule cells having pitches $\delta_x$ and $\delta_y$ with a reconstruction image area defined by a range of spreading of ± first-order diffracted light of given wavelength from a diffraction grating having grating pitches $2\delta_x$ and $2\delta_y$ that are twice as large as said pitches of cells, and an input image pattern reconstructed at said wavelength is recorded in said computer-generated hologram in such a way that a light portion of said input image pattern overlaps the center of said reconstruction image area.

Preferably in this case, the computer-generated hologram comprises a phase hologram having a multivalued phase distribution.

The present invention also provides a computer-generated hologram constructed as a transmission Fourier transform hologram for a holographic viewing device, wherein said computer-generated hologram comprises minuscule cells having pitches $\delta_x$ and $\delta_y$ with a reconstruction image area defined by a range of spreading of ± first-order diffracted light of given wavelength from a diffraction grating having grating pitches $2\delta_x$ and $2\delta_y$ that are twice as large as said pitches of cells, and an input image pattern reconstructed at said wavelength is recorded in said computer-generated hologram in such a way that a light portion of said input image pattern overlaps the center of said reconstruction image area.

Preferably in this case, the computer-generated hologram comprises a phase hologram having a multivalued phase distribution.

The computer-generated hologram of the present invention comprises minuscule cells having pitches $\delta_x$ and $\delta_y$ with the reconstruction image area defined by the range of spreading of ± first-order diffracted light of given wavelength from a diffraction grating having grating pitches $2\delta_x$ and $2\delta_y$ that are twice as large as said pitches of cells, and the input image pattern reconstructed at that wavelength is recorded in the computer-generated hologram in such a way that the light portion of the input image pattern overlaps the center of the reconstruction image area. Thus, the spot of zero-order transmitted light occurring at the center of the reconstruction image area is unnoticeable, posing no obstacle to viewing a reconstructed pattern that is seen in place of light sources in the scene. It is thus possible for the viewer to view the same bright pattern as the input image in place of the light sources in the scene seen through the spectacles.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIG. 3 is illustrative in section of one exemplary construction of the computer-generated hologram of the invention.

DESCRIPTION OF THE PREFERRED EMBODIMENTS

Embodiments of the holographic viewing device of the invention and the computer-generated hologram for the same are now explained.

Figure 1:
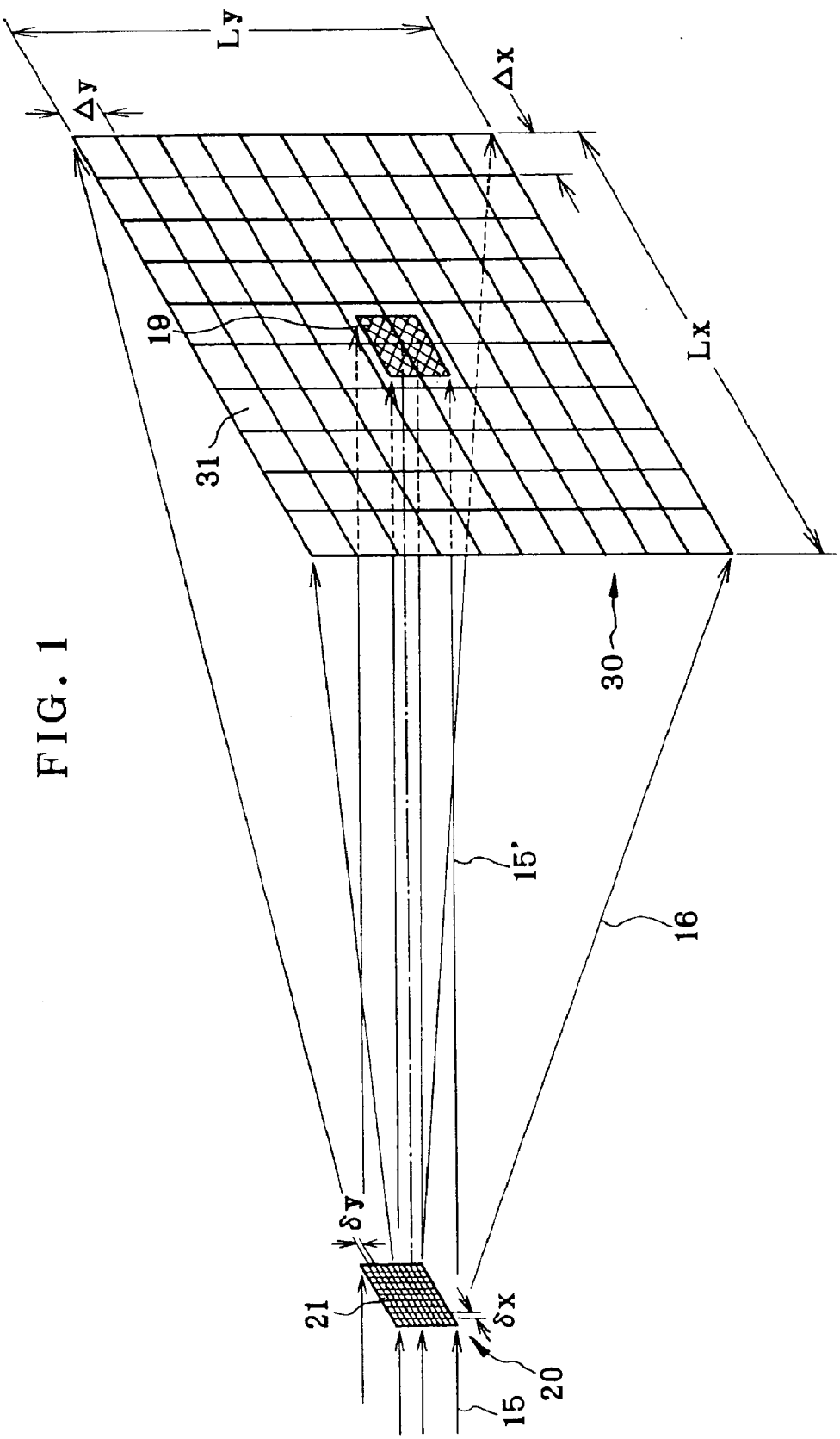
FIG. 1 is illustrative in schematic of a computer-generated hologram mounted on the frame of the holographic spectacles of the invention, and an image area reconstructed from the same.
Figure 6A:
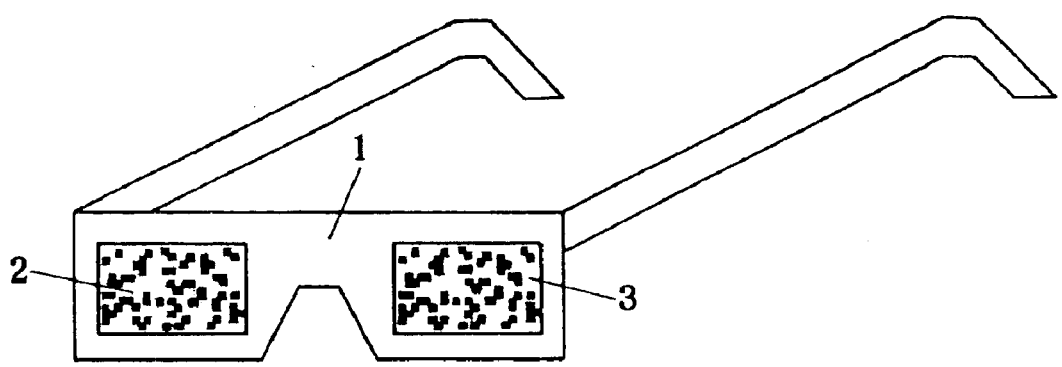
FIGS. 6(a), 6(b) and 6(c) are illustrative of conventional holographic spectacles and how they work.

FIG. 1 is illustrative in schematic of a computer-generated hologram 20 (corresponding to the transmission holograms 2, 3 of FIG. 6(a)) to be mounted on the frame of the holographic spectacles of the invention, and an image area 30 reconstructed from the same. The computer-generated hologram 20 is a Fourier transform hologram that comprises an array of minuscule cells 21 arranged in a matrix form with a size $\delta_y$ in the column (y-axis) direction and a size $\delta_x$ in the row (x-axis) direction. In this embodiment, each cell has phase information alone, as described later. The matrix array has $2^m$ cells 21 in the x-axis direction and $2^n$ cells 21 in the y-axis direction.

On the other hand, the image area 30 positioned far enough from the computer-generated hologram 20 comprises an array with $2^m \times 2^n$ cells 31 in the x- and y-directions, corresponding to the computer-generated hologram 20. Each cell 31 has a size $\Delta_y$ in the column (y-axis) direction and a size $\Delta_x$ in the row (x-axis) direction, and the image area 30 has a length $L_x$ in the x-axis direction and a length $L_y$ in the y-axis direction.

The lengths $L_x$ and $L_y$ of the image area 30 in the x- and y-axis directions have correlations with the sizes $\delta_x$ and $\delta_y$ of the cell 21 of the computer-generated hologram 20 in the x- and y-axis directions, respectively. In terms of the angle of diffraction from the computer-generated hologram 20 (the image area 30 is positioned far enough from the computer-generated hologram 20, and so the $L_x$ and $L_y$ should preferably be given by angle), $L_x$ corresponds to a range contained in the spreading of the ± first-order diffracted light from a diffraction grating having a spatial frequency of $1/(2\delta_x)$ and $L_y$ corresponds to a range contained in the spreading of the ± first-order diffracted light from a diffraction grating having a spatial frequency of $1/(2\delta_y)$. This correspond to the fact that the maximum spatial frequency recorded in the computer-generated hologram 20 is $1/(2\delta_x)$ in the x-axis direction and $1/(2\delta_y)$ in the y-axis direction.

Figure 6B:
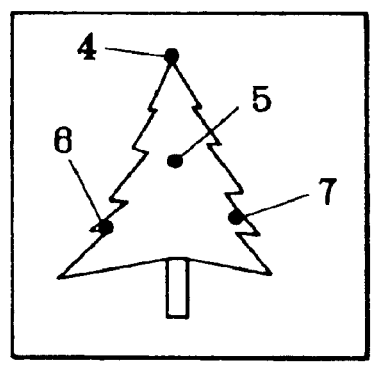
Figure 6C:
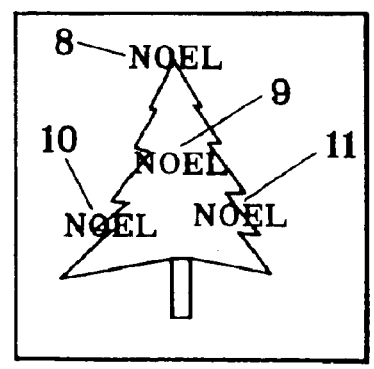

As, in such positions relations, parallel light 15 having a given wavelength enters the computer-generated hologram 20 from its front, diffracted light 16 occurs on the back surface side of the computer-generated hologram 20, so that a pattern recorded in the computer-generated hologram 20, for instance, such a letter "F" as described later is reconstructed on the image area 30 far away from the hologram 20. Accordingly, when the computer-generated hologram 20 is used instead of spectacle lenses to view a scene from the front, the user would see the letter "F". Thus, when the computer-generated hologram 20 is used to view such a scene as typically shown in FIG. 6(b), the user would see the pattern "F" in place of light sources 4, 5, 6 and 7.

A specific embodiment of how to calculate the phase information of each cell 21 such that the computer-generated hologram 20 reconstructs the pattern "F" is now explained. To impart given diffracted light to a reconstruction image plane, this embodiment relies on a method of calculating a computer-generated hologram to be located on a hologram surface while Fourier transform and inverse Fourier transform are alternately repeated between the reconstruction image plane and the hologram surface with the application of a bound condition. For that method called Gerchberg-Saxton iterative calculation method, for instance, see "Holograms and Diffraction Type Optical Elements—from fundamental theories to industrial applications" used as the text at the 22nd Winter Seminar held by the Optics Society of Japan (the Applied Physics Society of Japan), pp. 36–39.

Figure 2:
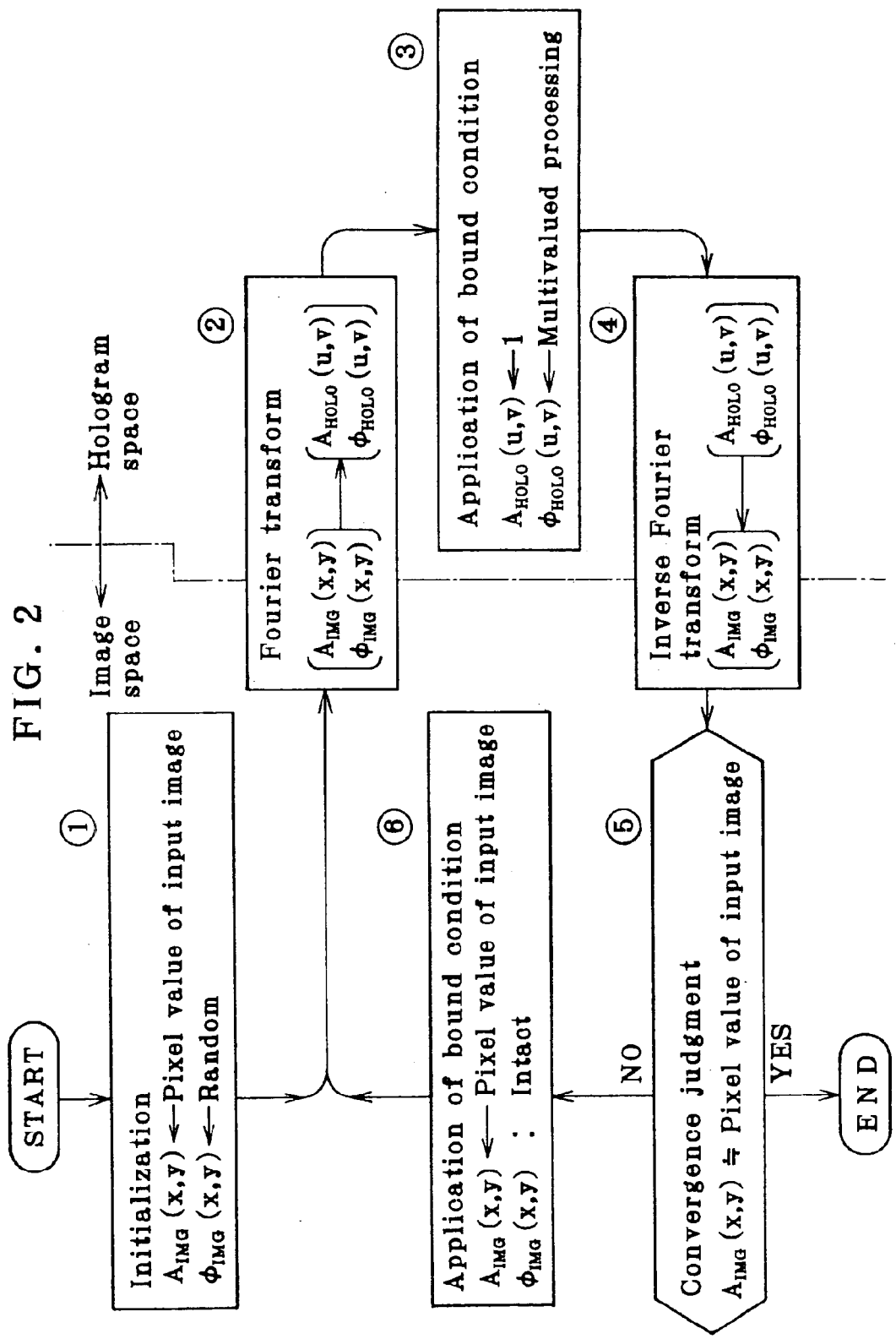
FIG. 2 is a flowchart of the steps for obtaining the computer-generated hologram of the invention.

To help understand the invention, suppose here that $A_{IMG}(x, y)$ is the amplitude distribution (pixel value) of an input image on the reconstruction image plane 30, $\phi_{IMG}(x, y)$ the phase distribution of the input image on the reconstruction image plane 30, $A_{HOLO}(u, v)$ the amplitude distribution of the input image on the hologram surface 20, and $\phi_{HOLO}(u, v)$ the phase distribution of the input image on the hologram surface 20. As shown in FIG. 2, in step (1) the pixel value of the input image to be recorded is given as $A_{IMG}(x, y)$ at the reconstruction image plane 30 area to initialize the phase distribution of the input image to a random value, and in step (2), Fourier transform is performed on the initialized value. In step (3), the amplitude distribution $A_{HOLO}(u, v)$ on the hologram surface 20, obtained by Fourier transform, is assumed to be unity to give a determined bound condition to make a multivalued phase distribution $\phi_{HOLO}(u, v)$ (quantization). After such a bound condition has been imparted, in step (4) inverse Fourier transform is performed on the amplitude distribution $A_{HOLO}(u, v)$ and phase distribution $\phi_{HOLO}(u, v)$ to which that bound condition is given. If, in convergence judgment step (5), the amplitude distribution $A_{IMG}(x, y)$ on the reconstruction image plane 30, obtained through that inverse Fourier transform, is found to be substantially equal to the pixel value of the input image, then the multivalued (quantized) phase distribution $\phi_{HOLO}(u, v)$ in step (3) becomes the phase distribution given to the cells 21 of the computer-generated hologram 20. If, in convergence judgment step (5), the amplitude distribution $A_{IMG}(x, y)$ obtained through inverse Fourier transform is found to be not equal to the pixel value of the input image, then a bound condition is imparted in step (6) in such a way that the pixel value of the input image is imparted in place of the amplitude distribution $A_{IMG}(x, y)$ while the phase distribution $\phi_{IMG}(x, y)$ obtained through inverse Fourier transform is maintained intact. After such a bound condition has been imparted, a loop of steps (2)→(3)→(4)→(5)→(6) is repeated until the condition for step (5) is satisfied or converged, which results in the final desired computer-generated hologram 20.

It is acceptable to perform the given multivalued processing after the condition for step (5) has been satisfied without performing multivalued processing on the phase distribution $\phi_{HOLO}(u, v)$ in step (3).

The depth distribution of an actual hologram is determined from the thus obtained multivalued phase distribution $\phi_{HOLO}(u, v)$. For such a transmission hologram as used herein, the depth is transformed into the depth $D(x, y)$ of the computer-generated hologram 20 on the basis of the following equation (1).

$$D(u, v) = \lambda \phi_{HOLO}(u, v) / \{2\pi(n_1 - n_0)\} \tag{1}$$

Here $\lambda$ is the center wavelength used, and $n_1$ and $n_0$ are the refractive indices of two materials that form the transmission hologram. As shown typically in the sectional view of FIG. 3, a relief pattern 18 having a depth D(u, v) found from equation (1) is formed on the surface of a transparent substrate 17 so that the computer-generated hologram 20 of the invention can be obtained. FIG. 3 is illustrative of a specific example of $\phi_{HOLO}(u, v)$ multivalued to four levels of 0, $\pi/2$, $\pi$ and 3 $\pi/2$. It is here noted the coordinates (u, v) on the hologram surface 20 are provided to make a difference with the coordinates (x, y) on the reconstruction image plane 30, with the u-axis direction corresponding to the x-axis direction and the v-axis direction to the y-axis direction.

Such a computer-generated hologram 20 of the invention as mentioned above is an in-line hologram. As already mentioned, even when the hologram is designed such that a 100% diffraction efficiency is obtainable at a given (design) wavelength, any phase condition is never satisfied at other wavelengths; as shown in FIG. 1, there is zero-order transmitted light 15' that reaches directly the reconstruction image plane 30 without being diffracted through the computer-generated hologram 20. When the computer-generated hologram 20 is actually fabricated, its phase distribution, etc. deviate more or less from the design values; the diffraction efficiency does not reach 100% even at the design wavelength, resulting again in the occurrence of such zero-order transmitted light 15'. This zero-order transmitted light 15' is seen as a spot 19 at the center (the center of the reconstruction image plane 30) of the reconstructed pattern that is seen in place of light sources in a scene, offering an obstacle to viewing the reconstructed pattern. Referring here to FIG. 1, an area 19 of the zero-order transmitted light 15' that reaches the reconstruction image plane 30 is shown as an finite area substantially similar to the outside shape of the computer-generated hologram 20 rather than as a spot; however, the viewer could perceive it as a spot because this area is actually far away from the hologram.

According to the present invention, therefore, an input image pattern is recorded in the computer-generated hologram 20 in such a way that a light portion of a pattern reconstructed on the reconstruction image plane 30 from the computer-generated hologram 20 is superposed on the spot 19 produced by the zero-order transmitted light.

Figure 4A:
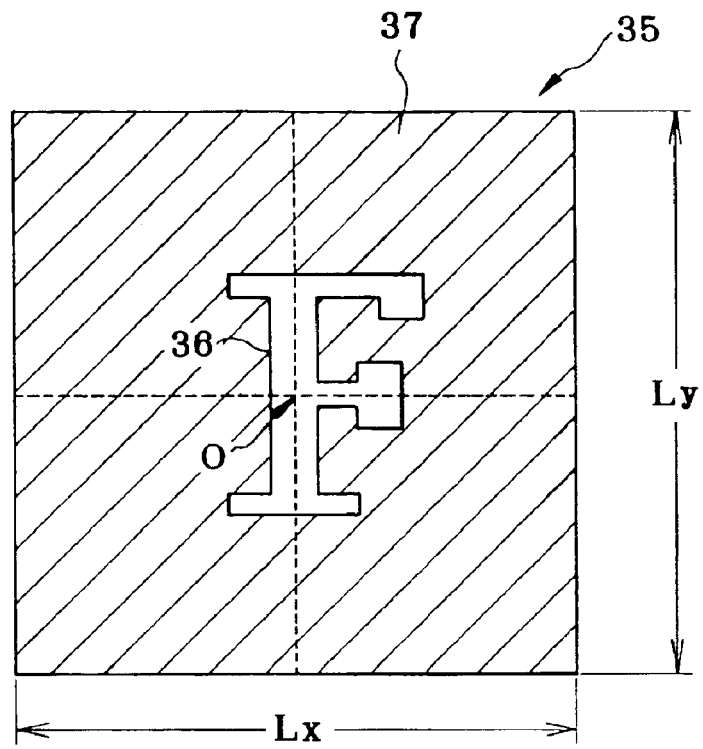
FIGS. 4(a) and 4(b) are illustrative of two specific examples of the input image pattern to be recorded in the computer-generated hologram according to the invention.
Figure 4B:
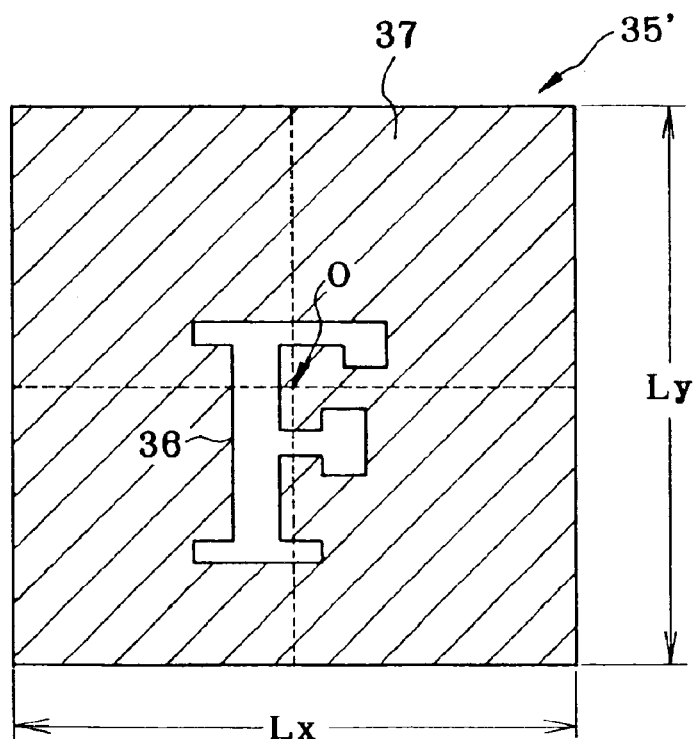

FIGS. 4(a) and 4(b) are illustrative of input image patterns 35 and 35' to be recorded in the computer-generated hologram 20. The input image pattern 35, 35' comprises a light portion 36 (defining a letter "F" portion) and a dark portion 37 (defining a background to the letter "F"). The selected size of the input image pattern 35, 35' is the same as the $L_y \times L_x$ size of the reconstruction image plane 30. In the input image pattern 35 of FIG. 4(a), its center O overlaps its light portion 36 (defining the letter "F" portion), and in the input image pattern 35' of FIG. 4(b), its center O overlaps its dark portion 37 (defining the background to the letter "F").

Figure 5A:
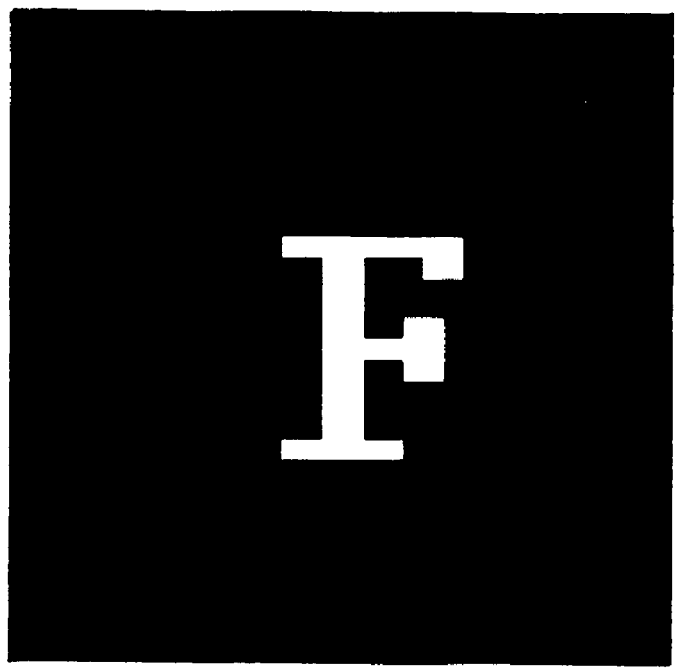
FIGS. 5(a) and 5(b) are illustrative of two embodiments of the image reconstructed from the computer-generated hologram fabricated according to the flowchart of FIG. 2, using the input image patterns of FIGS. 4(a) and 4(b).
Figure 5B:
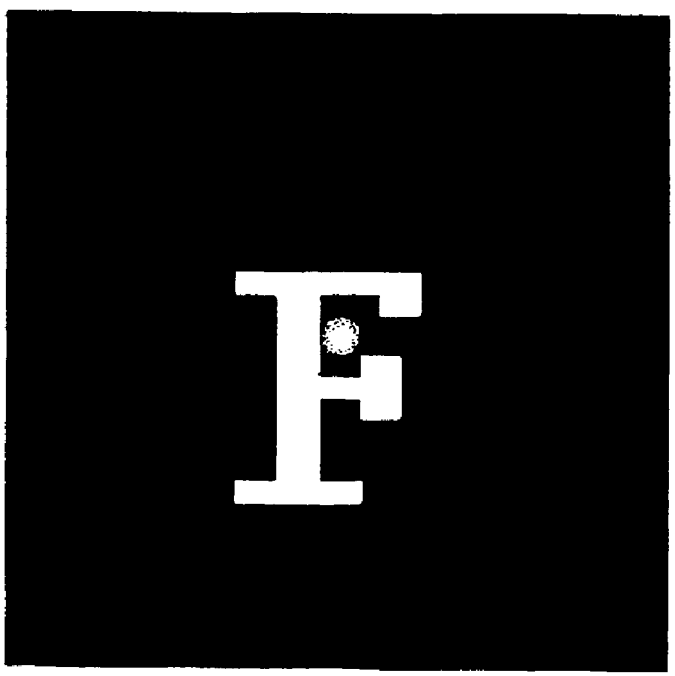

FIGS. 5(a) and 5(b) are illustrative of specific images reconstructed from the computer-generated hologram 20 fabricated according to the flowchart of FIG. 2 using such input image patterns 35 and 35' as shown in FIGS. 4(a) and 4(b). When the input image pattern 35 of FIG. 4(a) is used, the spot 19 of the zero-order transmitted light 15' occurring at the center of the reconstruction image plane 30 overlaps the light portion of the reconstructed pattern "F" (corresponding to the light portion 36 of the input image pattern 35) as shown in FIG. 5(a), and so the spot 19 of the zero-order transmitted light 15' is invisible (unnoticeable), offering no obstacle to viewing the reconstructed pattern "F" in place of the light sources in the scene. When the input image pattern 35' of FIG. 4(b) is used, by contrast, the spot 19 of the zero-order transmitted light 15' occurring at the center of the reconstruction image plane 30 is positioned in the dark portion (corresponding to the position of the dark portion 37 of the input image pattern 35') rather than in the light portion of the reconstructed pattern "F", and so it is seen brightly, not only offering an obstacle to viewing the reconstructed pattern "F" in place of the light sources in the scene but often making it impossible for the viewer to perceive the reconstructed pattern as "F" as well.

As explained above, the computer-generated hologram 20 of the present invention comprises minuscule cells 21 having pitches $\delta_x$ and $\delta_y$ with the reconstruction image area 30 defined by the range of spreading of ± first-order diffracted light of given wavelength from a diffraction grating having grating pitches $2\delta_x$ and $2\delta_y$ that are twice as large as said pitches of cells, and the input image pattern 35 reconstructed at that wavelength is recorded in the computer-generated hologram 20 in such a way that the light portion (for instance, the letter "F" portion in the aforesaid embodiment) of the input image pattern 35 overlaps the center of the reconstruction image area 30. Thus, the spot 19 of zero-order transmitted light 15' occurring at the center of the reconstruction image area 30 is unnoticeable, posing no obstacle to viewing a reconstructed pattern that is seen in place of light sources in the scene. It is thus possible for the viewer to view the same bright pattern as the input image in place of the light sources in the scene seen through the spectacles.

While the invention has been described with specific embodiments of the holographic spectacles and the computer-generated hologram for the same, it is understood that the invention may be modified in various fashions. It is also understood that the computer-generated hologram may be applicable to a holographic monocle as well as to windows or displays.

As can be appreciated from the foregoing, the present invention provides a holographic viewing device and a computer-generated hologram for the same, wherein the computer-generated hologram comprises minuscule cells having pitches $\delta_x$ and $\delta_y$ with a reconstruction image area defined by the range of spreading of ± first-order diffracted light of given wavelength from a diffraction grating having grating pitches $2\delta_x$ and $2\delta_y$ that are twice as large as said pitches of cells, and an input image pattern reconstructed at that wavelength is recorded in the computer-generated hologram in such a way that the light portion of the input image pattern overlaps the center of the reconstruction image area. Thus, the spot of zero-order transmitted light occurring at the center of the reconstruction image area is unnoticeable, posing no obstacle to viewing a reconstructed pattern that is seen in place of light sources in the scene. It is thus possible for the viewer to view the same bright pattern as the input image in place of the light sources in the scene seen through the viewing device.

What I claim is:

1. A holographic viewing device comprising a frame and a computer-generated hologram fitted in said frame, said computer-generated hologram constructed as a transmission Fourier transform hologram, wherein said computer-generated hologram comprises minuscule cells having pitches $\delta_x$ and $\delta_y$ with a reconstruction image area defined by a range of spreading of ± first-order diffracted light of given wavelength from a diffraction grating having grating pitches $2\delta_x$ and $2\delta_y$ that are twice as large as said pitches of cells, and an input image pattern reconstructed at said wavelength is recorded in said computer-generated hologram in such a way that a light portion of said input image pattern overlaps a center of said reconstruction image area created by a zero order light being transmitted.

2. The holographic viewing device according to claim 1, wherein said computer-generated hologram comprises a phase hologram having a multivalued phase distribution.

3. A computer-generated hologram constructed as a transmission Fourier transform hologram for a holographic viewing device, wherein said computer-generated hologram comprises minuscule cells having pitches $\delta_x$ and $\delta_y$ with a reconstruction image area defined by a range of spreading of ± first-order diffracted light of given wavelength from a diffraction grating having grating pitches $2\delta_x$ and $2\delta_y$ that are twice as large as said pitches of cells, and an input image pattern reconstructed at said wavelength is recorded in said computer-generated hologram in such a way that a light portion of said input image pattern overlaps a center of said reconstruction image area, created by a zero order light being transmitted.

4. The computer-generated hologram according to claim 3, which comprises a phase hologram having a multivalued phase distribution.

5. A holographic viewing device comprising:

a frame;

a computer generated hologram fitted in said frame;

the computer generated hologram further including:

cells having pitches $\delta_x$ and $\delta_y$;

a reconstruction image area defined by a range of spreading ± first-order diffracted light of a given wavelength from a diffraction grating having pitches $2\delta_x$ and $2\delta_y$;

an input image pattern reconstructed at said wavelength recorded in the hologram in such a way that at least a part of a light portion of the input image overlaps a spot created by a zero order light being transmitted.

6. The holographic viewing device of claim 5, wherein said computer-generated hologram comprised a phase hologram having a multi-valued phase distribution.

7. A computer generated hologram comprising:

cells having pitches $\delta_x$ and $\delta_y$;

a reconstruction image area defined by a range of spreading ± first-order diffracted light of a given wavelength from a diffraction grating having pitches $2\delta_x$ and $2\delta_y$;

an input image pattern reconstructed at said wavelength recorded in the hologram in such a way that at least a part of a light portion of the input image overlaps a spot created by a zero order light being transmitted.

8. The computer generated hologram of claim 7, wherein said computer-generated hologram comprised a phase hologram having a multi-valued phase distribution.

* * * * *